United States Patent
Zhang et al.

(10) Patent No.: US 10,643,018 B1
(45) Date of Patent: May 5, 2020

(54) SYSTEM AND METHOD FOR DETERMINING RETURN PATH QUALITY IN AN ELECTRICAL CIRCUIT

(71) Applicant: Cadence Design Systems, Inc., San Jose, CA (US)

(72) Inventors: Wenjian Zhang, Shanghai (CN); Brett Allen Neal, Windham, NH (US); Dennis Nagle, Peabody, MA (US); Dingru Xiao, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 113 days.

(21) Appl. No.: 15/989,393

(22) Filed: May 25, 2018

Related U.S. Application Data

(60) Provisional application No. 62/660,884, filed on Apr. 20, 2018.

(51) Int. Cl.
| | |
|---|---|
| *G06F 17/50* | (2006.01) |
| *G06F 30/398* | (2020.01) |
| *G06F 30/394* | (2020.01) |
| *G06F 30/23* | (2020.01) |
| *G06F 30/31* | (2020.01) |

(52) U.S. Cl.
CPC ............ *G06F 30/398* (2020.01); *G06F 30/23* (2020.01); *G06F 30/394* (2020.01); *G06F 30/31* (2020.01)

(58) Field of Classification Search
None
See application file for complete search history.

(56) References Cited

U.S. PATENT DOCUMENTS

| | | | | |
|---|---|---|---|---|
| 5,504,423 | A * | 4/1996 | Fang | G01R 31/2801 324/73.1 |
| 5,566,083 | A * | 10/1996 | Fang | G01R 31/2805 702/64 |
| 6,381,730 | B1 * | 4/2002 | Chang | G06F 17/5036 716/115 |
| 6,453,444 | B1 * | 9/2002 | Shepard | G06F 17/5036 716/102 |
| 6,922,822 | B2 * | 7/2005 | Frank | G06F 17/5077 716/112 |
| 7,353,483 | B2 * | 4/2008 | Hamada | G06F 17/5036 716/112 |
| 7,849,427 | B2 * | 12/2010 | Christo | G06F 17/5077 716/126 |
| 8,091,054 | B2 * | 1/2012 | Suaya | G06F 17/5077 716/110 |
| 8,312,402 | B1 * | 11/2012 | Okhmatovski | G06F 17/5018 716/113 |

(Continued)

*Primary Examiner* — Leigh M Garbowski
(74) *Attorney, Agent, or Firm* — Mark H. Whittenberger, Esq.; Holland & Knight LLP

(57) ABSTRACT

Embodiments include herein are directed towards a method for electronic circuit design and more specifically towards determining return path quality in an electrical circuit. Embodiments may include providing, using a processor, an electronic circuit design and identifying at least one net associated with the electronic circuit design. Embodiments may further include extracting an ideal loop inductance for the at least one net and extracting a real loop inductance for the at least one net. Embodiments may also include calculating a return path quality factor based upon, at least in part, the ideal loop inductance and the real loop inductance.

16 Claims, 11 Drawing Sheets

(56) References Cited

U.S. PATENT DOCUMENTS

| | | | |
|---|---|---|---|
| 8,667,446 B2* | 3/2014 | Suaya | G06F 17/5036 |
| | | | 716/126 |
| 8,799,842 B2* | 8/2014 | Tutuianu | G06F 17/5031 |
| | | | 716/110 |
| 8,826,204 B2* | 9/2014 | Suaya | G06F 17/5081 |
| | | | 716/101 |
| 9,230,054 B2* | 1/2016 | Suaya | G06F 17/5036 |
| 9,672,319 B1* | 6/2017 | Cao | G06F 30/394 |
| 9,715,569 B1* | 7/2017 | Liu | G06F 17/5072 |
| 9,864,827 B1* | 1/2018 | Tan | G06F 17/5072 |
| 10,068,039 B1* | 9/2018 | Vennam | G06F 17/5018 |

\* cited by examiner

FIG. 9

Simulation Table

| Net/Xnet Name | Return Path Quality Factor | Start Signal Pin | Start Return Pin | End Signal Pin | End Return Pin |
|---|---|---|---|---|---|
| PP_A<3> | 1.634 | U2.T13 | U2.U12 | DDR4_DIMM1.72 | DDR4_DIMM1.56 |
| PP_A<13> | 1.607 | U2.T8 | U2.P9 | DDR4_DIMM1.229 | DDR4_DIMM1.231 |
| PP_A<11> | 1.500 | U2.T14 | U2.P15 | DDR4_DIMM1.207 | DDR4_DIMM1.199 |
| PP_PARITY | 1.363 | U2.R3 | U2.R2 | DDR4_DIMM1.219 | DDR4_DIMM1.231 |
| PP_A<7> | 1.328 | U2.V14 | U2.U12 | DDR4_DIMM1.208 | DDR4_DIMM1.199 |
| PP_A<9> | 1.327 | U2.W14 | U2.U12 | DDR4_DIMM1.65 | DDR4_DIMM1.56 |
| PP_A<10> | 1.320 | U2.AB10 | U2.U12 | DDR4_DIMM1.68 | DDR4_DIMM1.231 |
| PP_A<6> | 1.285 | U2.W13 | U2.U12 | DDR4_DIMM1.222 | DDR4_DIMM1.199 |
| PP_A<4> | 1.254 | U2.V13 | U2.U12 | DDR4_DIMM1.211 | DDR4_DIMM1.199 |
| PP_A<5> | 1.234 | U2.AA13 | U2.Y11 | DDR4_DIMM1.210 | DDR4_DIMM1.199 |
| PP_A<1> | 1.227 | U2.AA12 | U2.Y11 | DDR4_DIMM1.71 | DDR4_DIMM1.231 |
| PP_A<2> | 1.227 | U2.AB12 | U2.P15 | DDR4_DIMM1.213 | DDR4_DIMM1.199 |
| PP_A<0> | 1.226 | U2.R14 | U2.Y11 | DDR4_DIMM1.73 | DDR4_DIMM1.56 |
| PP_A<12> | 1.223 | U2.AB14 | U2.Y11 | DDR4_DIMM1.64 | DDR4_DIMM1.231 |
| PP_A<8> |  | U2.AB13 | U2.Y11 | DDR4_DIMM1.67 | DDR4_DIMM1.199 |

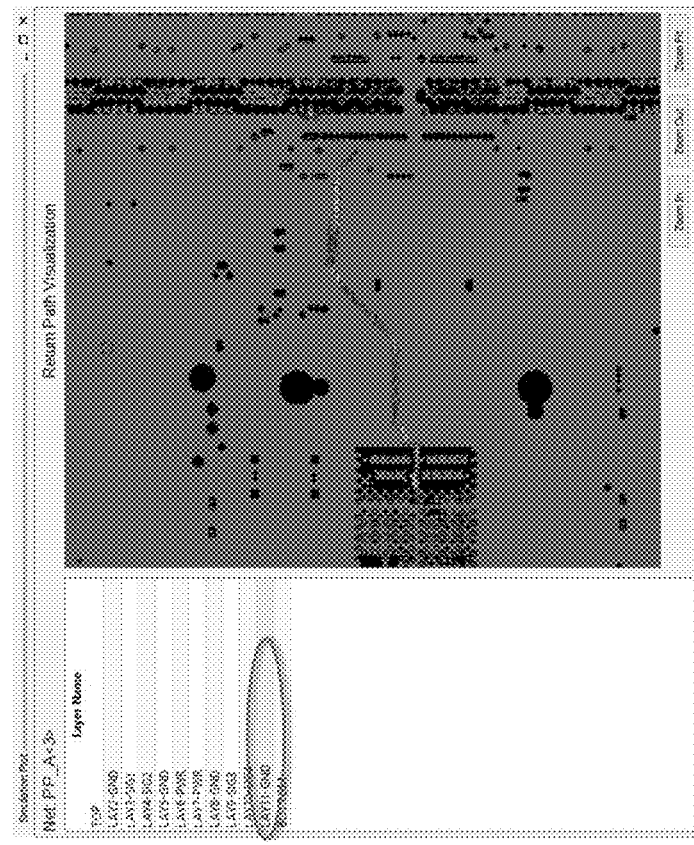
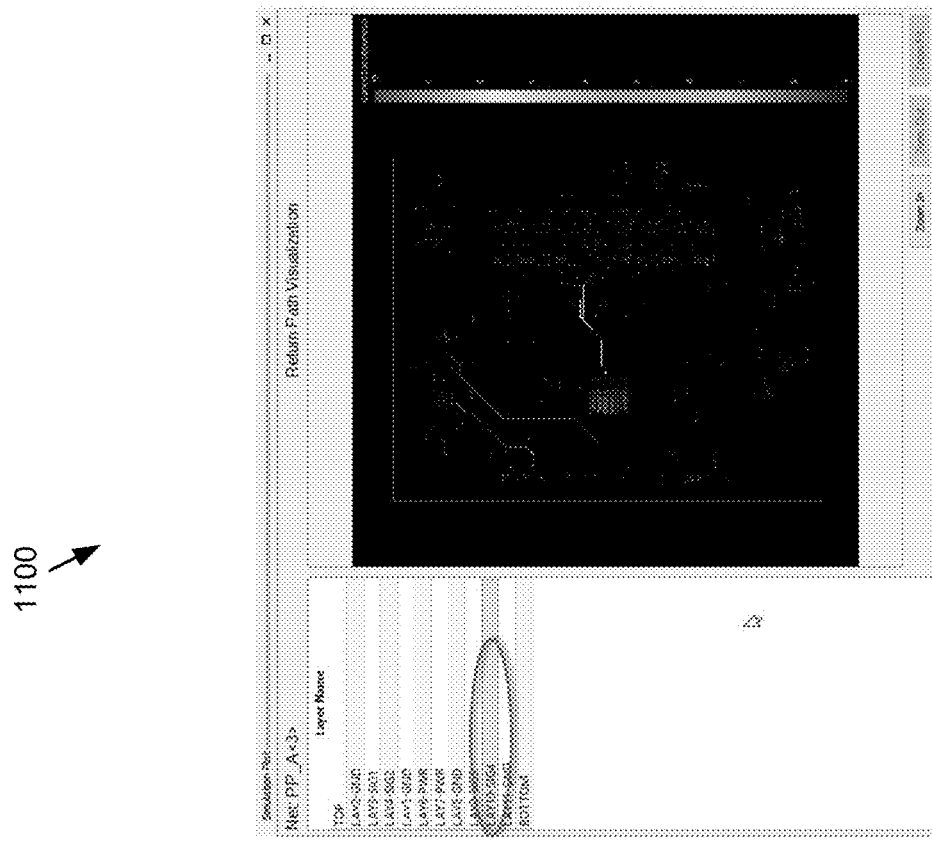
FIG. 11

SYSTEM AND METHOD FOR DETERMINING RETURN PATH QUALITY IN AN ELECTRICAL CIRCUIT

CROSS-REFERENCE TO RELATED APPLICATIONS

This application claims the benefit of U.S. Provisional Application having Ser. No. 62/660,884 filed on Apr. 20, 2018, the entire contents of which is incorporated herein by reference in its entirety.

BACKGROUND

Electrical circuits require a return path to operate. In a printed circuit board ("PCB"), a predictable, well defined return path ensures proper operation. A poorly defined return path can be the cause for a range of issues from poor signal quality and performance to electromagnetic interference ("EMI") radiation to complete board failure. These issues can be random in nature and difficult to debug. Discontinuities in the return path can increase current loops leading to EMI problems and possible compliance failure with regulatory limits. There is no effective, full-board screening analysis capability available today. Existing approaches rely on either geometric checks or full-wave simulation. Geometric checks are reasonable from a performance aspect for full-board screening but cannot accurately model or simulate the actual return path. Full-wave solvers can be used to accurately model and determine return path current but are extremely compute-resource intensive making them impractical for analyzing a complete layout.

SUMMARY

In one or more embodiments of the present disclosure, a computer-implemented method for determining return path quality in an electrical circuit is provided. The method may include providing, using a processor, an electronic circuit design and identifying at least one net associated with the electronic circuit design. Embodiments may further include extracting an ideal loop inductance for the at least one net and extracting a real loop inductance for the at least one net. Embodiments may also include calculating a return path quality factor based upon, at least in part, the ideal loop inductance and the real loop inductance.

One or more of the following features may be included. In some embodiments, the return path quality factor may be a ratio of the real loop inductance to the ideal loop inductance. The method may further include displaying at a graphical user interface a plurality of return path quality factors, wherein each return path quality factor corresponds to a distinct net of the electronic design. The real loop inductance may be extracted using a hybrid solver. The real loop inductance may be based upon, at least in part, one or more of stitching vias, signal vias, reference plane changes, decoupling capacitors, and a coupling between two nets. The at least one net may be between two pins of the electronic design. The method may include generating a directed group that includes the at least one net. The ideal loop inductance may be extracted using a two-dimensional solver. The method may include displaying at a graphical user interface a visualization of an identified return path between two pins of the at least one net.

In one or more embodiments of the present disclosure a non-transitory computer-readable storage medium having stored thereon instructions that when executed by a machine result in the following operations is provided. Operations may include providing, using a processor, an electronic circuit design and identifying at least one net associated with the electronic circuit design. Operations may further include extracting an ideal loop inductance for the at least one net and extracting a real loop inductance for the at least one net. Operations may also include calculating a return path quality factor based upon, at least in part, the ideal loop inductance and the real loop inductance.

One or more of the following features may be included. In some embodiments, the return path quality factor may be a ratio of the real loop inductance to the ideal loop inductance. Operations may further include displaying at a graphical user interface a plurality of return path quality factors, wherein each return path quality factor corresponds to a distinct net of the electronic design. The real loop inductance may be extracted using a hybrid solver. The real loop inductance may be based upon, at least in part, one or more of stitching vias, signal vias, reference plane changes, decoupling capacitors, and a coupling between two nets. The at least one net may be between two pins of the electronic design. Operations may include generating a directed group that includes the at least one net. The ideal loop inductance may be extracted using a two-dimensional solver. Operations may include displaying at a graphical user interface a visualization of an identified return path between two pins of the at least one net.

In one or more embodiments of the present disclosure, a system for determining return path quality in an electrical circuit is provided. The system may include a computing device having at least one processor configured to provide, using a processor, an electronic circuit design and identify at least one net associated with the electronic circuit design. The at least one processor may be further configured to extract an ideal loop inductance for the at least one net and to extract a real loop inductance for the at least one net. The at least one processor may be further configured to calculate a return path quality factor based upon, at least in part, the ideal loop inductance and the real loop inductance.

One or more of the following features may be included. In some embodiments, the return path quality factor may be a ratio of the real loop inductance to the ideal loop inductance.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 9 is a diagram depicting a graphical user interface in accordance with the present disclosure;

FIG. 10 is a diagram depicting a graphical user interface in accordance with the present disclosure; and FIG. 11 is a diagram depicting a portion of an electronic design showing a highlighted return path that is displayed on a graphical user interface in accordance with embodiments of the present disclosure.

DETAILED DESCRIPTION

Figure 1:
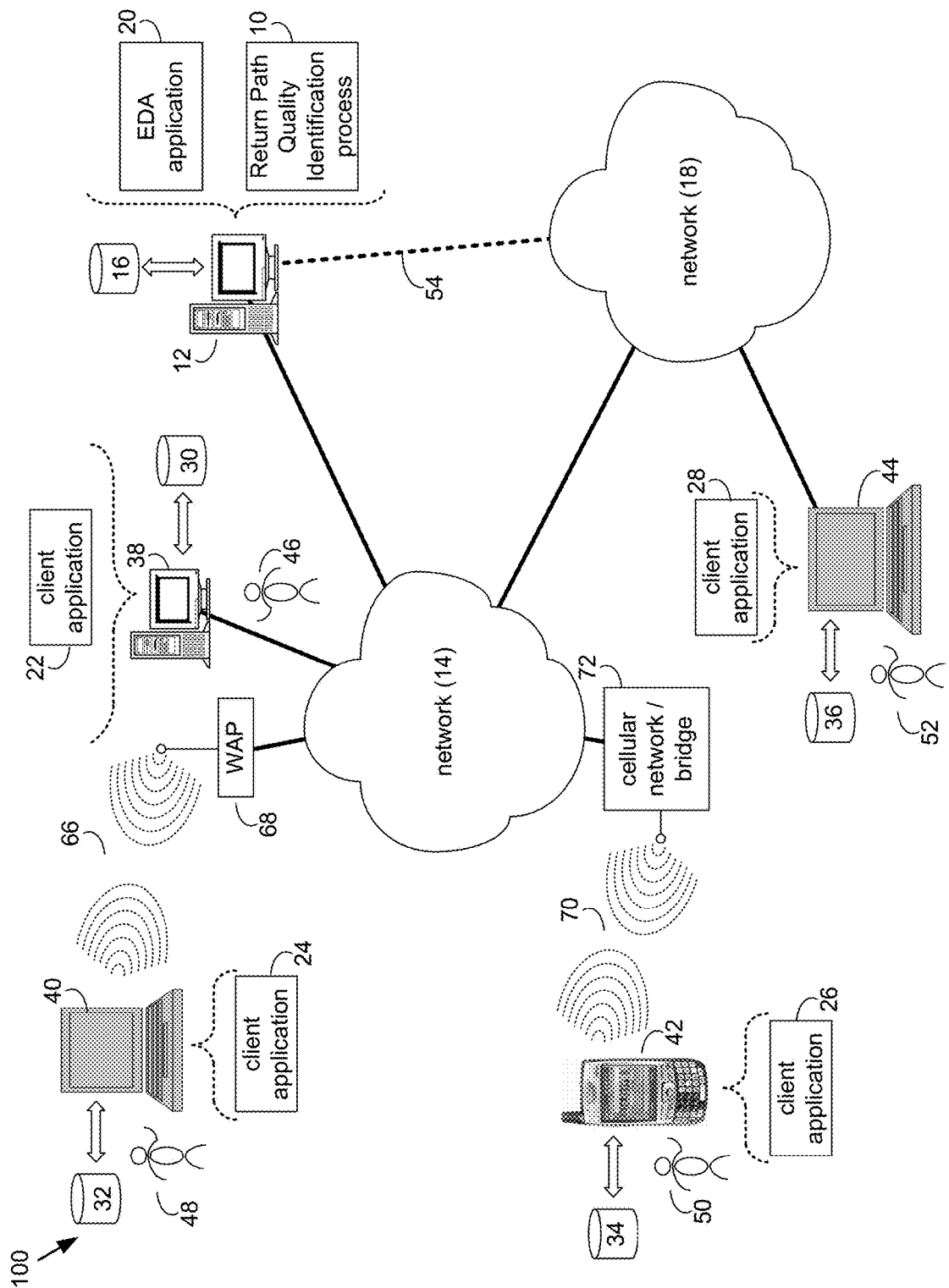
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 1, there is shown a return path quality identification process 10 that may reside on and may be executed by server computer 12, which may be connected to network 14 (e.g., the Internet or a local area network). Accordingly, embodiments of return path quality identification process 10 may be performed in whole or in part in the cloud. For example, using network 14, network 18, etc. Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, return path quality identification process 10 may reside on and be executed, in whole or in part, by a client electronic device, such as a personal computer, notebook computer, personal digital assistant, or the like.

The instruction sets and subroutines of return path quality identification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. As such, embodiments of return path quality identification process 10 may occur wholly or partly in the cloud. For example, some or all of the operations associated with return path quality identification process 10 may occur in one portion of the cloud where others occur in other portions of the cloud. Various other embodiments incorporating cloud computing methodologies are also within the scope of the present disclosure.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Return path quality identification process 10 may be a stand alone application, or may be an applet/application/script that may interact with and/or be executed within EDA application 20. In addition/as an alternative to being a server-side process, return path quality identification process 10 may be a client-side process (not shown) that may reside on a client electronic device (described below) and may interact with an EDA client application (e.g., one or more of EDA client applications 22, 24, 26, 28). Further, return path quality identification process 10 may be a hybrid server-side/client-side process that may interact with EDA application 20 and an EDA client application (e.g., one or more of client applications 22, 24, 26, 28). As such, return path quality identification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize return path quality identification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
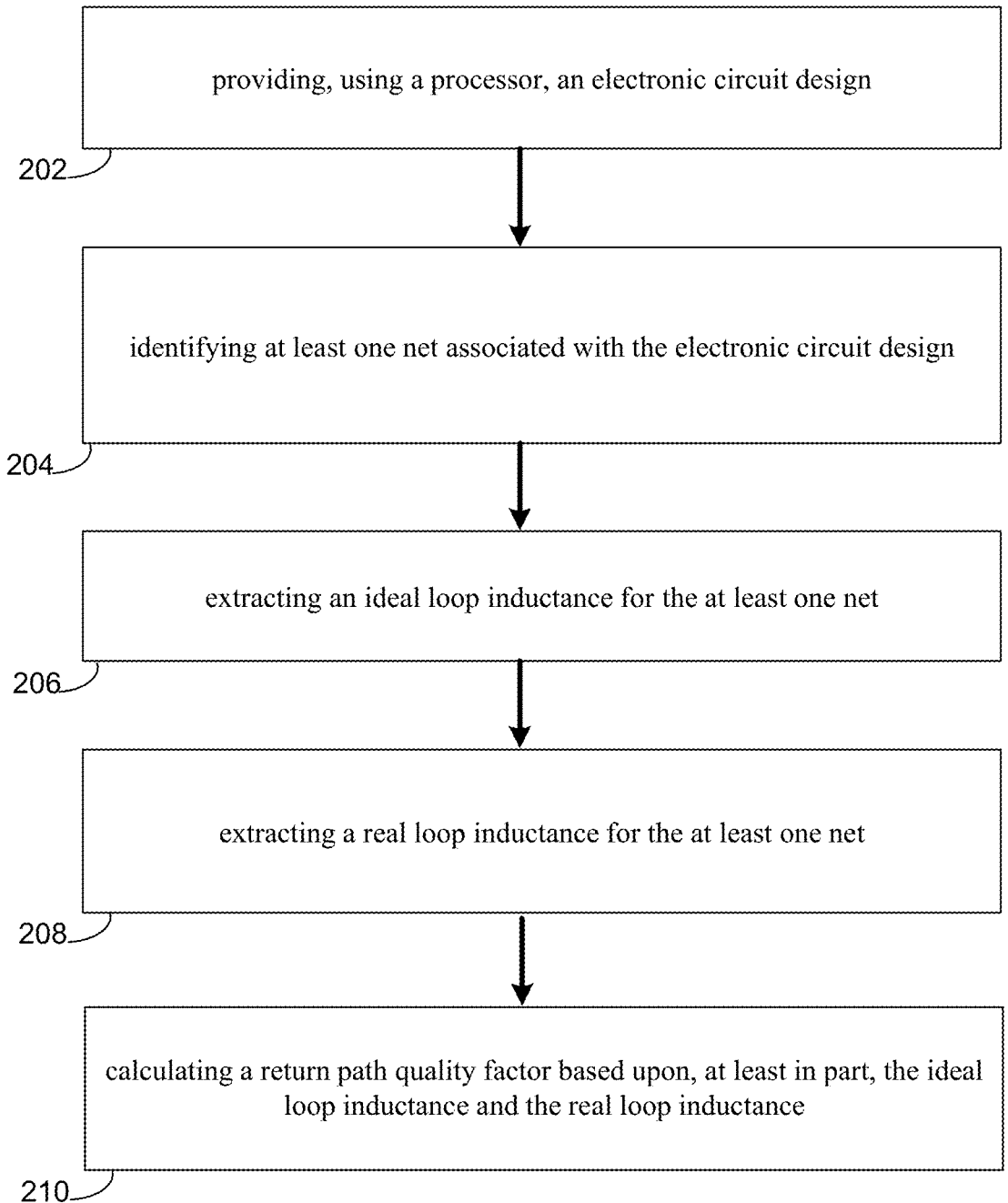
FIG. 2 is a flowchart depicting operations consistent with the return path quality identification process in accordance with an embodiment of the present disclosure.

Referring now to FIG. 2, an exemplary flowchart 200 depicting operations consistent with return path quality identification process 10 is provided. The method may include providing (202), using a processor, an electronic circuit design and identifying (204) at least one net associated with the electronic circuit design. Embodiments may further include extracting (206) an ideal loop inductance for the at least one net and extracting (208) a real loop inductance for the at least one net. Embodiments may also include calculating (210) a return path quality factor based upon, at least in part, the ideal loop inductance and the real loop inductance.

As discussed above, electrical circuits require a return path to operate. In a PCB, a predictable, well defined return path ensures proper operation. A poorly defined return path can be the cause for a range of issues from poor signal quality and performance to EMI radiation to complete board failure. These issues can be random in nature and difficult to debug. Discontinuities in the return path can increase current loops leading to EMI problems and possible compliance failure with regulatory limits.

Existing approaches rely on either geometric checks or full-wave simulation. Geometric checks are reasonable from a performance aspect for full-board screening but cannot accurately model or simulate the actual return path. Full-wave solvers can be used to accurately model and determine return path current but are extremely compute-resource intensive making them impractical for analyzing a complete layout.

Embodiments of return path quality identification process 10 may be used to provide methodologies for generating a relative return path quality assessment. In some embodiments, RPQI process 10 may be configured to use static and hybrid solvers to overcome the compute-resource and time limitations. Solvers will allow for accurate modeling of the return current flow overcoming the limitation of geometric approaches.

In some embodiments, RPQI process 10 may utilize a concept referred to herein as the return path quality factor ("RPQF"), which may use solver results to compare actual and ideal return paths. This analysis will be reasonable enough from a compute-resource and time perspective to allow for screening of an entire design. In some embodiments, and as is discussed in further detail below, the RPQF ratios may indicate potential return path issues. Values can be compared across all results and values larger than 1 may indicate a potential return path problem. The relative deviation measured from an 'ideal' return path allows the user to quickly focus on more problematic signals and also see outliers within a larger signal interface.

In some embodiments, RPQI process 10 may use static and hybrid solvers to overcome the compute-resource and time limitations. In this way, solvers may allow for accurate modeling of the return current flow overcoming the limitation of geometric approaches.

Figure 3:
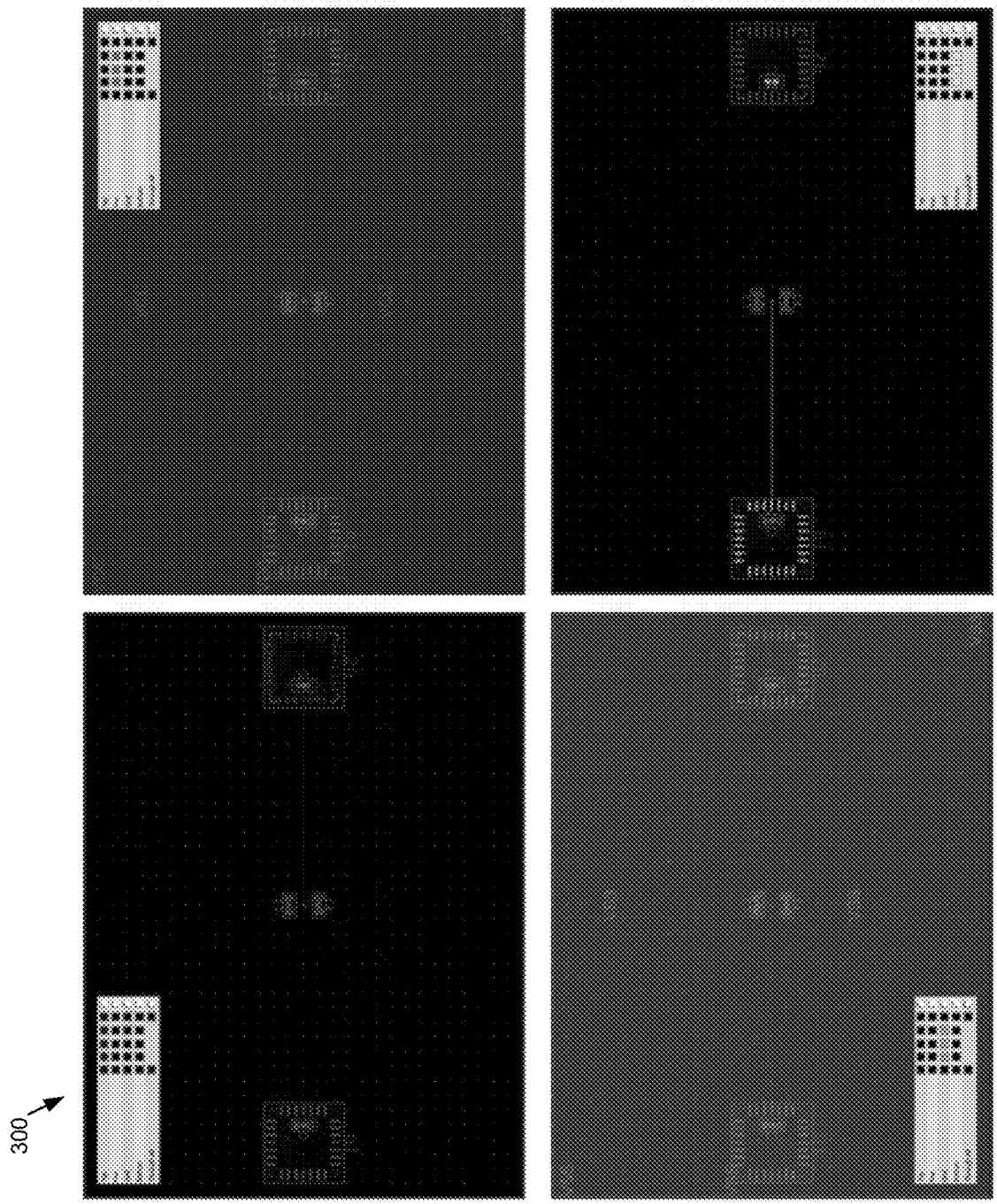
FIG. 3 is a diagram depicting a portion of an electronic design displayed on a graphical user interface in accordance with embodiments of the present disclosure.

Referring also to FIG. 3, a diagram showing a graphical user interface 300 consistent with embodiments of RPQI process 10 is provided. The example four layer design shown in FIG. 3 will be used to explain how to evaluate the quality of return path. In this particular example, Net SIGO may be routed on TOP layer and BOTTOM layer and the reference plane changes from GND layer to PWR layer. The net between U1.1 and U2.1 will be analyzed.

Figure 4:
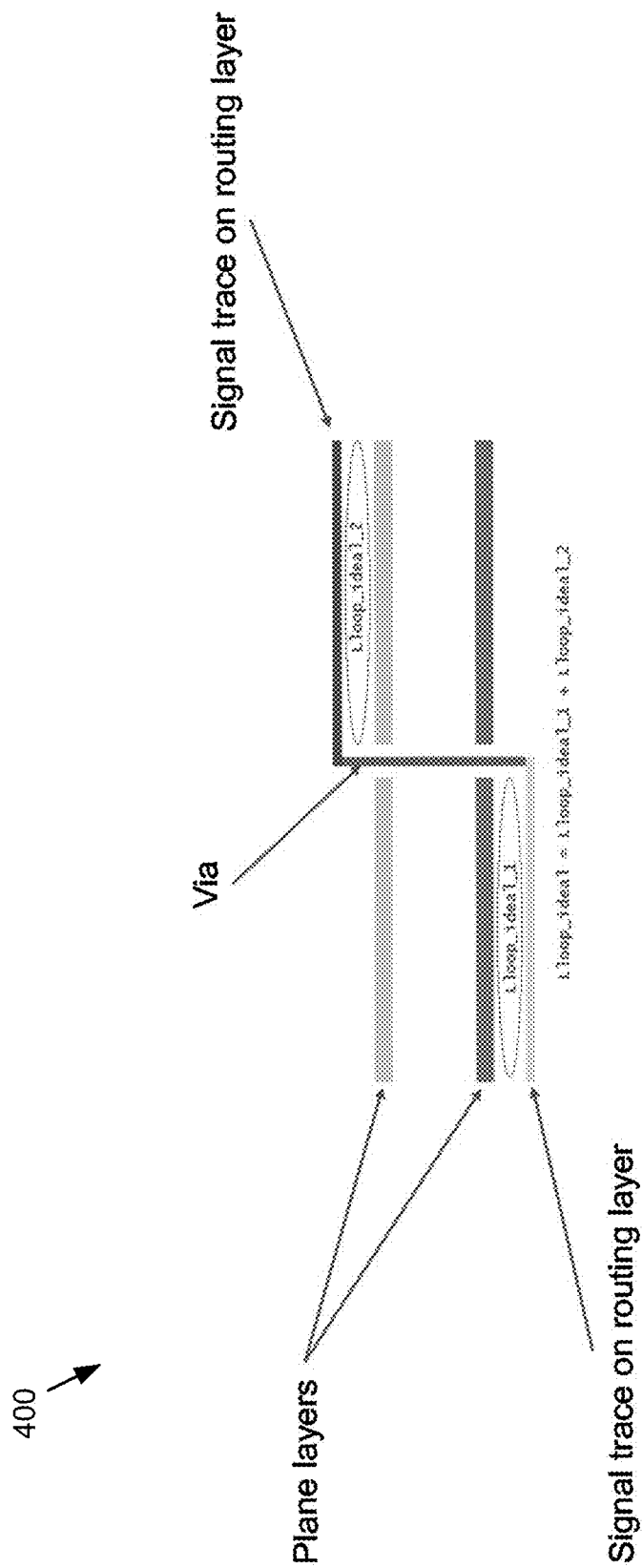
FIG. 4 is a diagram depicting an ideal loop inductance extraction process in accordance with embodiments of the present disclosure.

In some embodiments, the first step may involve extracting an ideal loop inductance ($L_{loop\_ideal}$) for a selected net between two pins. An example showing an ideal loop inductance extraction is provided in FIG. 4. More specifically, FIG. 4 describes how to extract the ideal loop inductance for the design in FIG. 3. Here, the two dimensional solver may assume ideal planes (e.g., perfect shape on plane layers) and for each unique trace segment, calculates the loop inductance for that trace and the nearest plane. These loop inductances may then be summed to determine the total ideal loop inductance.

In some embodiments, there are a number of rules utilized for the return path analysis of RPQI process 10. The first rule to remember when identifying the path of a current is that all currents return to their source. The second rule to apply when identifying the path of a current is that current favors the path(s) of least impedance. Accordingly, embodiments of RPQI process 10 may be configured to extract the ideal loop inductance based on these two rules. We define the nearest PLANE layer(s) as the reference layer(s) for the dine even there is no real shapes on this layer. In this way, only dines and its reference layer(s) may be considered during the ideal loop inductance extraction.

In some embodiments, once the ideal loop inductance has been extracted, the real loop inductance ($L_{loop\_real}$) must then be extracted for a selected net between two pins. In some cases, a hybrid solver may be employed to extract the real loop inductance. The real loop inductance may include, but is not limited to, the effects of stitching vias, signal vias, reference plane changes, decoupling capacitors, the coupling between different nets, etc.

In some embodiments, the final step may involve calculating the return path quality factor (RPQF):

$$RPQF = \frac{L_{loop\_real}}{L_{loop\_ideal}}$$

Figure 9:
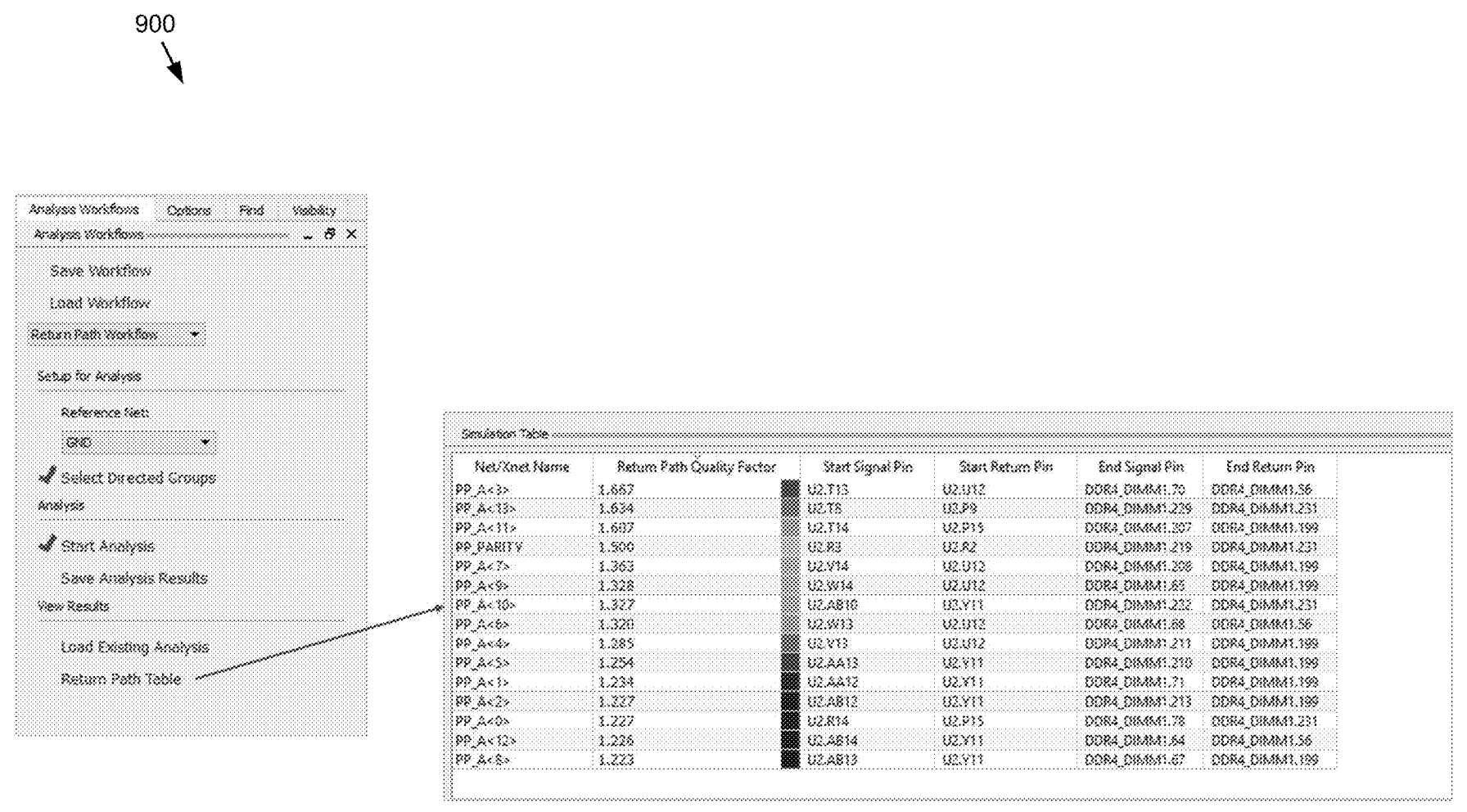

FIGS. 9-10 depict graphical user interfaces 900, 1000 displaying the extracted RPQF results for a PCB design. As shown in the figures, some or all nets may be sorted by the RPQF value. Accordingly, an engineer or designer may easily find the nets which have potential return path issue from this table.

Figure 5:
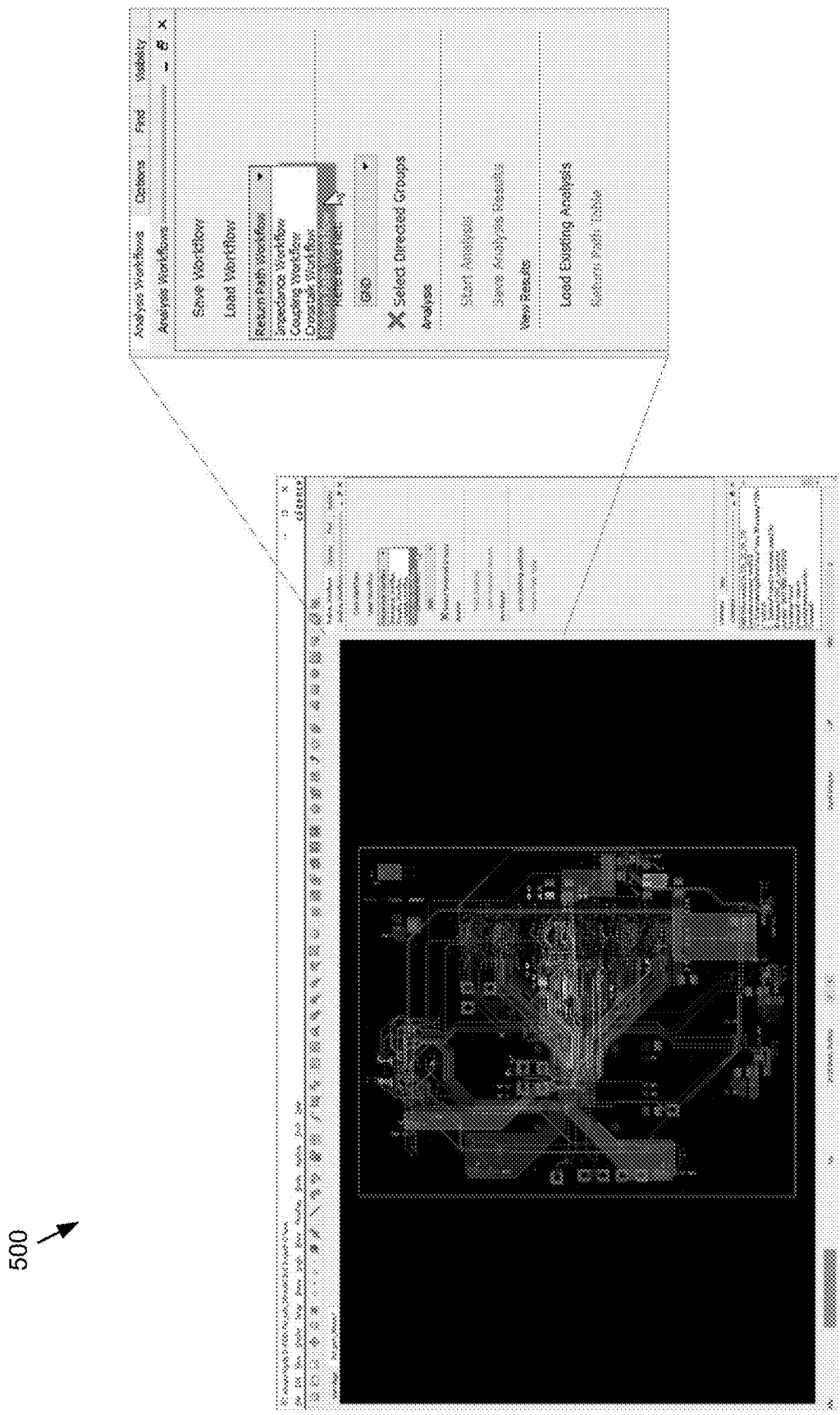
FIG. 5 is a diagram depicting a portion of an electronic design displayed on a graphical user interface in accordance with embodiments of the present disclosure.

Referring now to FIG. 5, a graphical user interface 500 showing an example for the creation of one or more directed groups is provided. As shown in FIG. 5, the option of "return path" may be provided to the designer as one of several analysis workflows.

Figure 6:
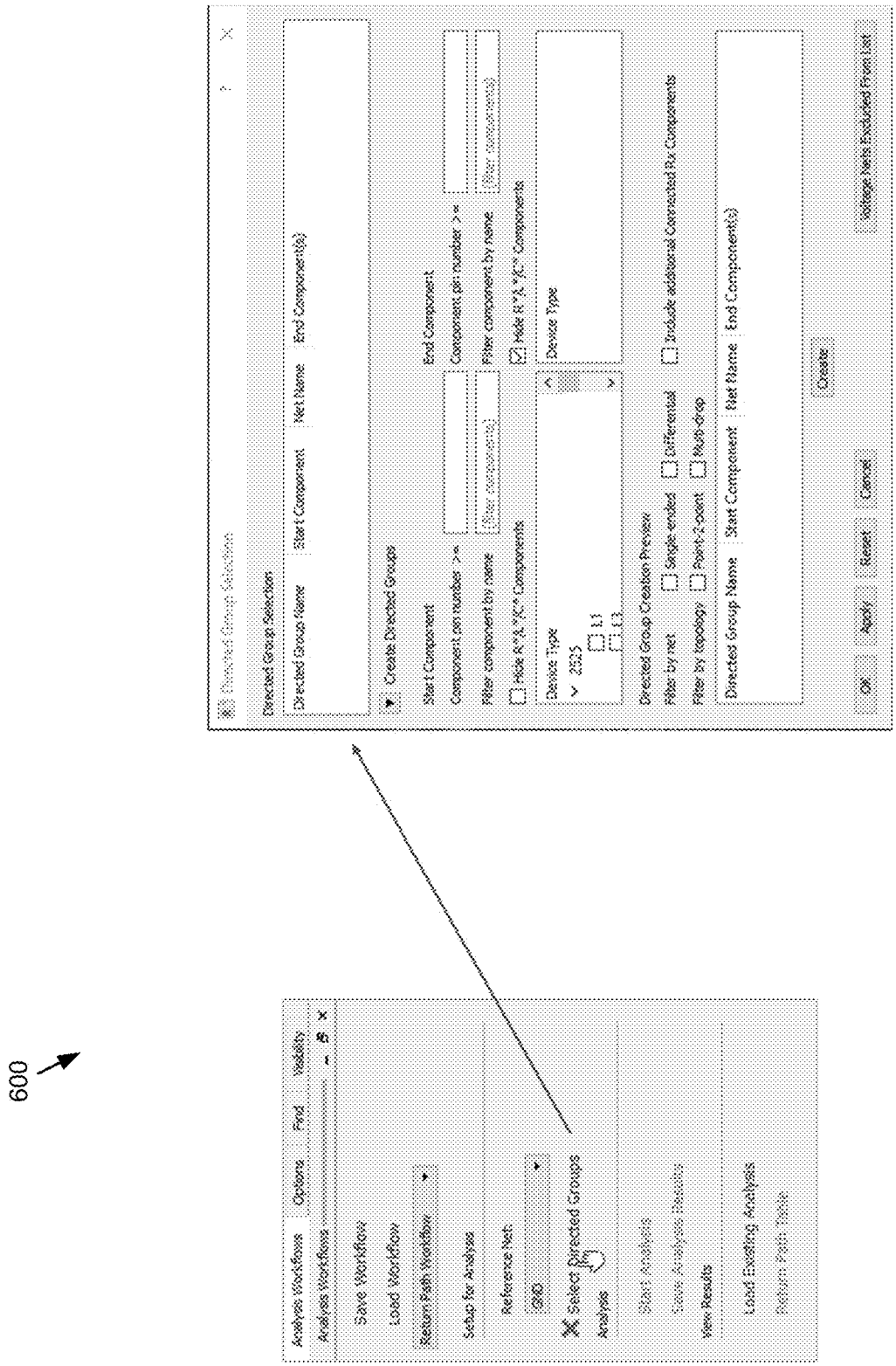
FIG. 6 is a diagram depicting a graphical user interface in accordance with the present disclosure.

Upon selection of the return path option, RPQI process 10 may then display one or more graphical user interfaces such as those shown in FIG. 6. For example, FIG. 6 provides the designer with the option to select one or more reference net(s) and then select and/or create one or more directed groups. As used herein, "Directed Group" creation may refer to net selection based on component connectivity. This functionality may also allow for finding the return path pins on the same component.

Figure 7:
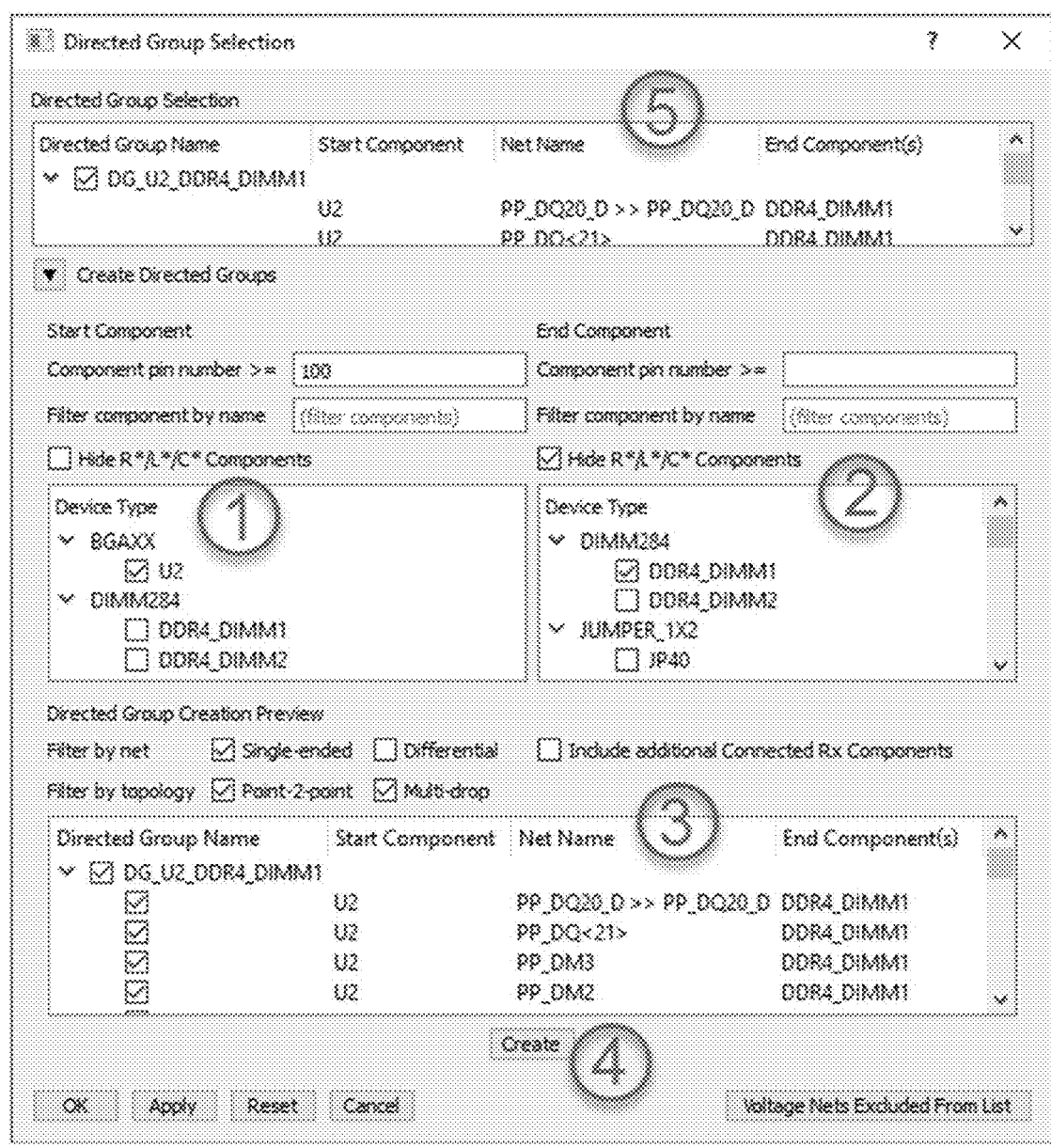
FIG. 7 is a diagram depicting a graphical user interface in accordance with the present disclosure.

In operation, and referring to FIGS. 6-7, RPQI process 10 may allow the designer to use one or more filters to select a start component (item 1 in FIG. 7). The designer may then select one or more end components (item 2 in FIG. 7). In some embodiments, this field may populate once a start component is selected. The graphical user interface portion depicted by item 3 may populate once an end component is selected. Accordingly, the set of nets may be further refined. Upon selection of the create button shown in item 4, RPQI process 10 may then generate the directed group, which may then be displayed in the graphical user interface portion identified in item 5. The designer may then select one or more of the directed groups.

Figure 8:
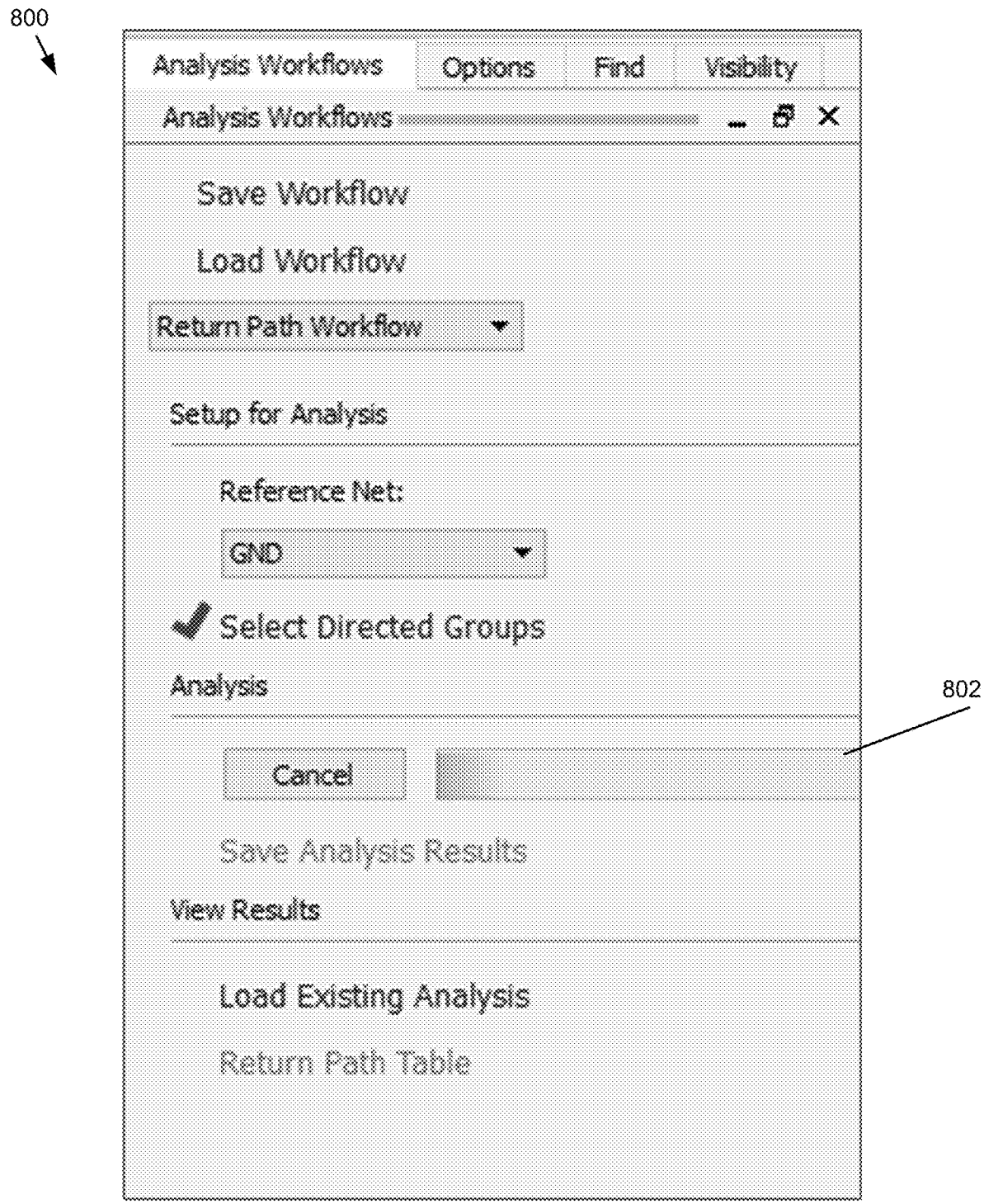
FIG. 8 is a diagram depicting a graphical user interface in accordance with the present disclosure.

Referring now to FIG. 8, a diagram of a graphical user interface 800 is provided. GUI 800 may allow the designer to begin the analysis. In some embodiments, once a Directed Group is selected the Start Analysis button may be enabled on GUI 800. After selecting Start Analysis, the link may be replaced with a status meter 802. RPQI process 10 may then utilize the 2D solver to determine the ideal loop inductance ($L_{loop\_ideal}$) followed by the hybrid solver to determine the actual loop Inductance ($L_{loop\_real}$). The RPQF may then be determined as a ratio of the real to the ideal loop inductance:

$$RPQF = \frac{L_{loop\_real}}{L_{loop\_ideal}}$$

Referring now to FIGS. 9-10, diagrams of a graphical user interfaces 900, 1000 are provided. GUI 900 may provide a sortable view of the results of RPQI process 10. In some embodiments, selecting an RPQF cell may then generate a view in the canvas to visualize the Return Path as is shown in FIG. 11. This plot pane allows for a layered view of the signal and return path current with pan and zoom.

Accordingly, embodiments of RPQI process 10 may allow for efficient and timely evaluation of return path quality for an entire or any subset of a PCB design. The setup and performance allows for use by more members of the design team. Results may then be quickly evaluated and fixed to prevent return path issues. The exact causes for the deviation will be identified through inspection by the engineer on the high RPQF signals, or those specific signals could then be targeted for full wave analysis. In the absence of this technology, engineers are typically only able to evaluate a small set of signals and this generally requires more advanced knowledge.

In some embodiments, RPQI process 10 may be used in the manufacturing of one or more hardware devices. Using the results of RPQI process 10 an electronic circuit design may be altered and eventually fabricated based upon, at least in part, the results of RPQI process 10. RPQI process 10 may employ powerful, non-generic computing devices and platforms, including, but not limited to, static and hybrid solvers to implement one or more operations of the process. More information regarding the solvers described herein and others may be found in U.S. Pat. Nos. 9,864,827, 9,715,569, 8,312,402, 5,566,083, and 5,504,423 which are each incorporated herein by reference in their entity.

In the foregoing specification, embodiments of process 10 have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer-implemented method for determining return path quality in an electrical circuit comprising:
   providing, using a processor, an electronic circuit design;
   identifying at least one net associated with the electronic circuit design;
   extracting an ideal loop inductance for the at least one net, wherein the ideal loop inductance is extracted using a two-dimensional solver;
   extracting a real loop inductance for the at least one net, wherein the real loop inductance is extracted using a hybrid solver; and
   calculating a return path quality factor based upon, at least in part, the ideal loop inductance and the real loop inductance.

2. The computer-implemented method of claim 1 wherein the return path quality factor is a ratio of the real loop inductance to the ideal loop inductance.

3. The computer-implemented method of claim 1 further comprising:
   displaying at a graphical user interface a plurality of return path quality factors, wherein each return path quality factor corresponds to a distinct net of the electronic design.

4. The computer-implemented method of claim 1 wherein the real loop inductance is based upon, at least in part, one or more of stitching vias, signal vias, reference plane changes, decoupling capacitors, and a coupling between two nets.

5. The computer-implemented method of claim 1 wherein the at least one net is between two pins of the electronic design.

6. The computer-implemented method of claim 1 further comprising:
    generating a directed group that includes the at least one net.

7. The computer-implemented method of claim 1 further comprising:
    displaying at a graphical user interface a visualization of an identified return path between two pins of the at least one net.

8. A non-transitory computer-readable storage medium having stored thereon instructions that when executed by a machine result in the following operations:
    providing, using a processor, an electronic circuit design;
    identifying at least one net associated with the electronic circuit design;
    extracting an ideal loop inductance for the at least one net, wherein the ideal loop inductance is extracted using a two-dimensional solver;
    extracting a real loop inductance for the at least one net, wherein the real loop inductance is extracted using a hybrid solver; and
    calculating a return path quality factor based upon, at least in part, the ideal loop inductance and the real loop inductance.

9. The non-transitory computer-readable storage medium of claim 8 wherein the return path quality factor is a ratio of the real loop inductance to the ideal loop inductance.

10. The non-transitory computer-readable storage medium of claim 8 further comprising:
    displaying at a graphical user interface a plurality of return path quality factors, wherein each return path quality factor corresponds to a distinct net of the electronic design.

11. The non-transitory computer-readable storage medium of claim 8 wherein the real loop inductance is based upon, at least in part, one or more of stitching vias, signal vias, reference plane changes, decoupling capacitors, and a coupling between two nets.

12. The non-transitory computer-readable storage medium of claim 8 wherein the at least one net is between two pins of the electronic design.

13. The non-transitory computer-readable storage medium of claim 8 further comprising:
    generating a directed group that includes the at least one net.

14. The non-transitory computer-readable storage medium of claim 8 further comprising:
    displaying at a graphical user interface a visualization of an identified return path between two pins of the at least one net.

15. A system for determining return path quality in an electrical circuit comprising:
    a computing device having at least one processor configured to provide, using a processor, an electronic circuit design and identify at least one net associated with the electronic circuit design, the at least one processor further configured to extract an ideal loop inductance for the at least one net, wherein the ideal loop inductance is extracted using a two-dimensional solver, the at least one processor further configured to extract a real loop inductance for the at least one net, wherein the real loop inductance is extracted using a hybrid solver, the at least one processor further configured to calculate a return path quality factor based upon, at least in part, the ideal loop inductance and the real loop inductance.

16. The system of claim 15 wherein the return path quality factor is a ratio of the real loop inductance to the ideal loop inductance.

* * * * *